(No Model.)
2 Sheets—Sheet 1.
W. CLEMENS.
HORSE HAY RAKE.
No. 419,828. Patented Jan. 21, 1890.
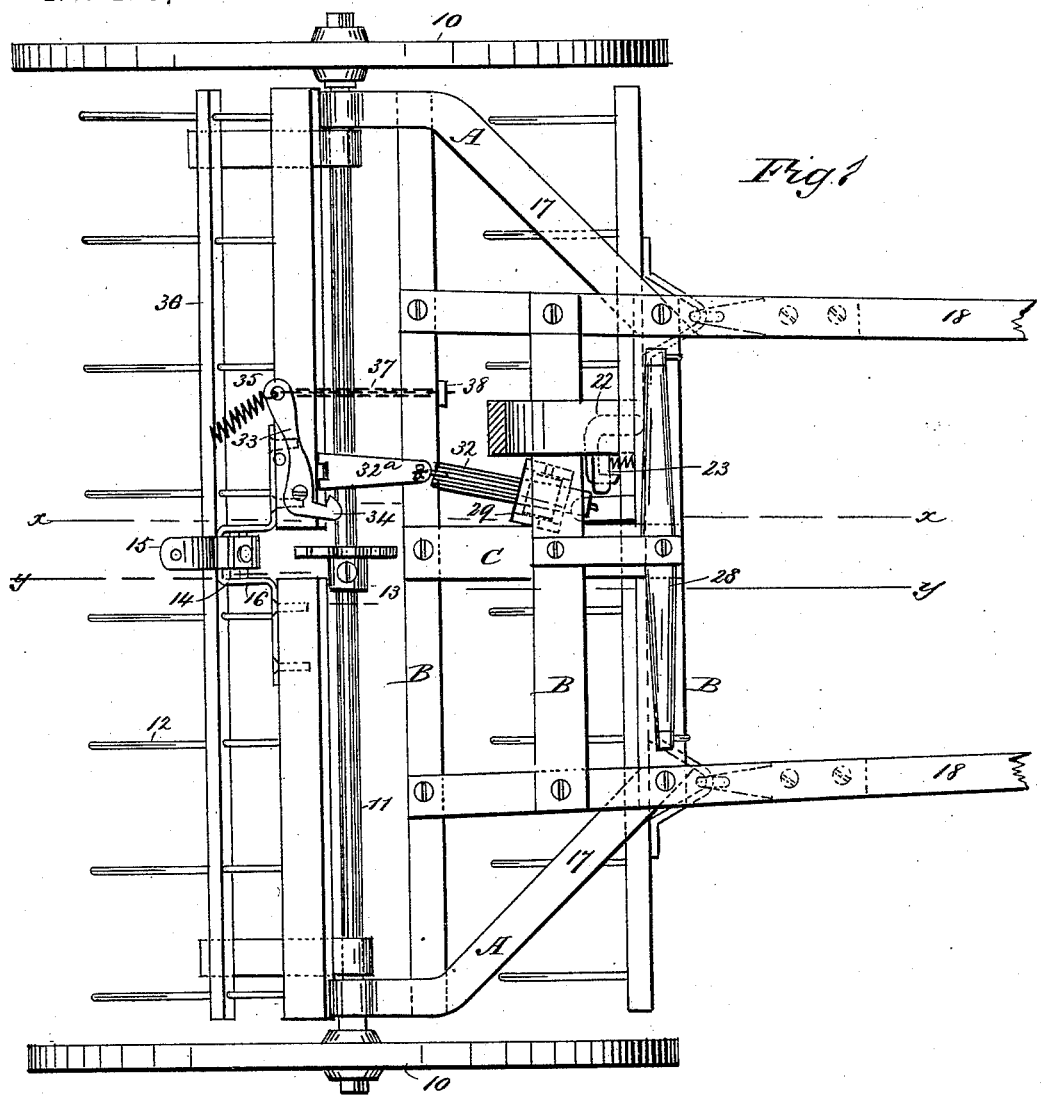
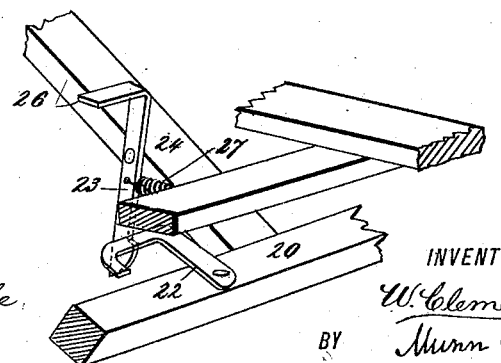
WITNESSES:
Francis McArdle
C. Sedgwick
INVENTOR:
W. Clemens
BY Munn & Co
ATTORNEYS.

(No Model.) 2 Sheets—Sheet 2.

W. CLEMENS.
HORSE HAY RAKE.

No. 419,828. Patented Jan. 21, 1890.

WITNESSES:
F. McArdle,
C. Sedgwick

INVENTOR:
W. Clemens
BY
Munn & Co.
ATTORNEYS.

UNITED STATES PATENT OFFICE.

WILLARD CLEMENS, OF LE ROY, NEW YORK.

HORSE HAY-RAKE.

SPECIFICATION forming part of Letters Patent No. 419,828, dated January 21, 1890.

Application filed May 3, 1889. Serial No. 309,500. (No model.)

*To all whom it may concern:*

Be it known that I, WILLARD CLEMENS, of Le Roy, in the county of Genesee and State of New York, have invented a new and Improved Horse Hay-Rake, of which the following is a full, clear, and exact description.

My invention relates particularly to that class of horse hay-rakes in which an auxiliary rake is arranged in advance of the main rake, which auxiliary rake is capable of being dropped to clear the space upon the ground to receive the load carried by the main rake.

The object of the invention is to provide a more improved and efficient means whereby the auxiliary rake may be dropped independent of the main rake, and wherein, when the main rake is elevated to drop its load and is carried down again to its normal position, the auxiliary rake, if lowered, will be simultaneously elevated with the lowering of the said main rake.

The invention consists in the novel construction and combination of the several parts, as will be hereinafter more fully set forth, and pointed out in the claims.

Reference is to be had to the accompanying drawings, forming a part of this specification, in which similar letters and figures of reference indicate corresponding parts in all the views.

Figure 2:
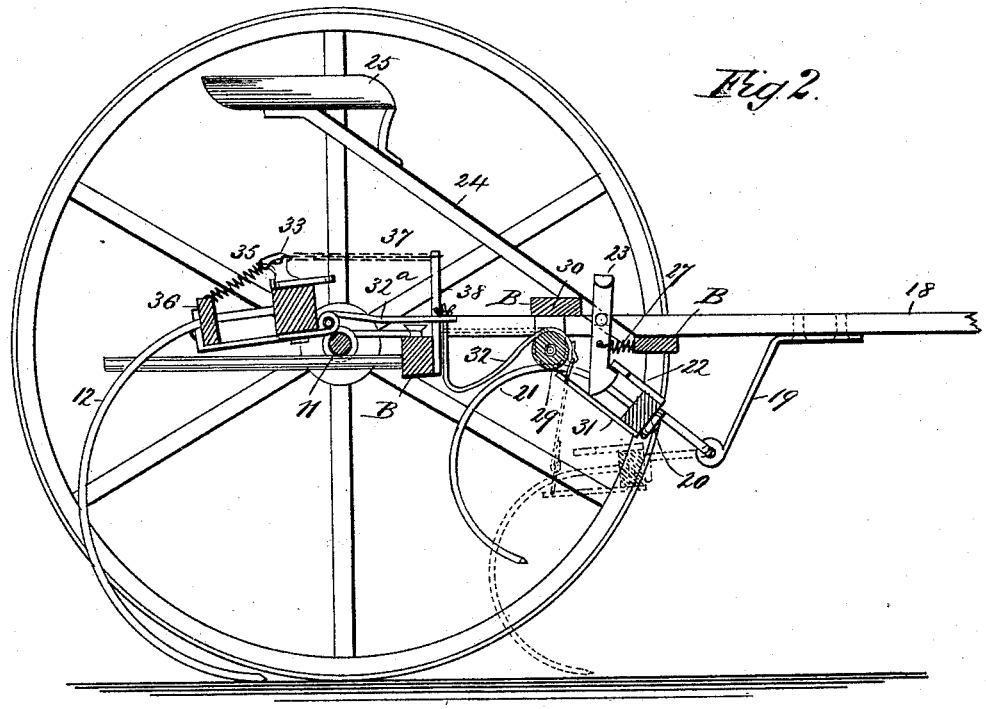
Figure 3:
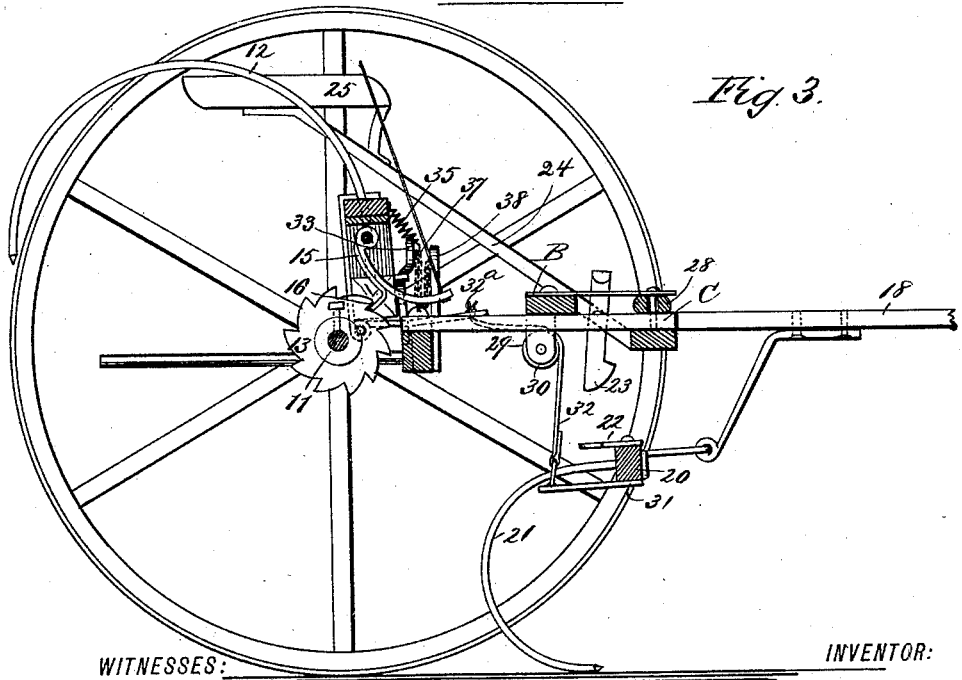

Figure 1 is a plan view of a rake provided with my improvement. Fig. 2 is a section on line $x$ $x$ of Fig. 1. Fig. 3 is a similar section on line $y$ $y$ of Fig. 1, and Fig. 4 is a detail perspective view illustrating the position and shape of the drop-lever connected with the forward or auxiliary rake.

In carrying out the invention the drive-wheels 10 are mounted upon a suitable axle 11, and upon the said axle any ordinary form of rake 12 is hinged, which rake 12 is the main rake of the implement, being adapted to gather the hay. The rake 12 may be elevated in any suitable or approved manner, one means of accomplishing this result being illustrated in the drawings, and consisting in mounting rigidly upon the axle 11, at or near its center, a ratchet-wheel 13, the teeth whereof incline in the direction of the forward end of the implement. The rake-head opposite the ratchet-wheel is cut away, and the space thus made is covered at the rear of the rake-head by a yoke 14, secured thereto, as best illustrated in Fig. 1, in which yoke a lever 15 is fulcrumed, carrying a lip or pawl 16 upon its inner face adapted for contact with the teeth of the ratchet-wheel 13. The said lever may be carried inward to a contact with the ratchet-wheel in any suitable or approved manner by the driver when seated, or thrown out of gear by him when desired. When the pawl or lip 16 of the lever 15 is made to contact with the teeth of the ratchet-wheel and the implement is drawn forward, the axle is revolved by reason of the drive-wheels 10 being rigidly secured thereto, and thereby the lever is carried upward and forward by the revolution of the ratchet-wheel, which lever carries with it the rake-head, consequently elevating the teeth from the ground. After the lever has traveled a sufficient distance over the ratchet-wheel it is released and the rake 12 is permitted to drop fully to the ground.

Upon the axle 11 the forward frame 17 of the implement is hinged, to which frame the shafts or thills 18 are rigidly secured. This forward frame 17 is preferably triangular, the smaller end being the forward end, and consists of metallic angled side bars A, three or more transverse beams B, parallel with the axle, and one or more cross-bars C, connecting the said transverse beams, as best illustrated in Fig. 1. I do not, however, confine myself to this construction of the frame, as the said construction may be varied without departing from the spirit of the invention.

Upon the under side of each thill or shaft 18, near the connection of the same with the forward frame 17 of the implement, a hanger 19 is secured, in which hanger the head 20 of the auxiliary rake 21 is hinged or pivoted. The rake-head 20 is provided at its top, at one side of the center thereof, with an angled keeper-plate 22, as best illustrated in Fig. 4, which keeper-plate extends rearward, and is adapted to be engaged by a latch 23, pivoted upon one side of a rearwardly-inclined standard 24, which standard supports the driver's seat 25. The said latch 23 is provided at its lower end with a head, and at its upper end with an attached horizontal foot-bar 26, whereby the driver may conveniently trip the latch when desired.

The auxiliary rake 21 is normally held in an elevated position by the head of the latch 23 contacting with the angled keeper-plate 22, as also shown in Fig. 4, and the latch is held in this position normally through the medium of a spring 27, secured to the latch below its fulcrum and to the forward transverse beam B of the frame, upon which crossbeam the singletree 28 is attached.

To the under side of one of the transverse beams B, preferably the center one, a hanger 29 is secured, in which hanger a friction-roller 30 is pivoted, as illustrated in Figs. 2 and 3, and from the under side of the head of the auxiliary rake 21 a bracket-bar 31 is horizontally and rearwardly projected, to which bracket-bar one end of a strap or chain 32 is secured, which strap or chain passes upward over the friction-roller 30, and is secured at its upper end to the plate or bar 32$^a$, hinged upon the forward face of the head of the main rake 12, as best illustrated in Fig. 1.

At one side of the center of the main rake-head, upon its outer face, an angle-lever 33 is pivoted, one member whereof normally extends parallel with the rake-head in the direction of one extremity thereof, and the other member, which terminates in a latch-head 34, normally projects transversely beyond the said rake-head in the direction of the front of the implement, as shown in Fig. 1.

The member of the lever 33, extending parallel with the main rake-head, is longer than the other member, and is provided at its extremity with an aperture or eye, to which eye a spring 35 is secured, which spring is likewise attached to a spacing-bar 36 of the main rake, as also best illustrated in Fig. 1. This spring retains the lever in its normal position and draws tightly a chain 37, attached to said apertured end of the lever and to the vertical standard 38, projected upward from the forward face of the rear transverse bar B of the frame.

In operation the forward or auxiliary rake is normally held in an elevated position, as shown in positive lines in Fig. 2, by contact of the latch 23 with the keeper 22, as best illustrated in Fig. 4. When a sufficient quantity of hay has been gathered by the main rake, which is in contact with the ground, and prior to dumping the load of hay thus carried by the main rake, the driver presses upon the foot-bar 26 of the latch 23, and thereby disengages said latch from the keeper plate or bar 22, whereupon the auxiliary rake drops to the ground and the weight of the rake draws the strap or chain 32 downward, thereby carrying the hinged bar 32$^a$, connected with the upper end of the said strap or chain, to a horizontal position. This position, however, should be the normal position of the said bar. The position of the strap or chain when the auxiliary rake is dropped is illustrated in dotted lines in Fig. 2. As the implement is drawn forward the forward rake 21 clears the ground of all trash, and when a sufficient space has been cleared the lever 15 is brought in contact with the ratchet-wheel 13, and the rear or main rake is elevated in the manner heretofore stated, and the load is dropped upon the ground. When the main rake has been brought to the dumping position, the latch-head 34 of the lever 33, pivoted upon the head of the said main rake, engages with the edge of the hinged bar 32$^a$, as indicated in Fig. 3, and when the lever 15 is released from the ratchet-wheel and the main rake thus permitted to drop, as the rake-head of the main rake assumes its normal position, the hinged bar 32$^a$ is carried upward by the lever 33, and the said hinged bar, drawing upon the strap or chain 32, causes the forward or auxiliary rake to be also elevated, until the keeper 22 of said rake contacts with the latch 23. Thus as the main rake is dropped to receive another load the auxiliary rake is carried upward out of the way. As soon as the rear or main rake assumes its normal position, the spring 35, acting upon the lever 33, causes said lever to disengage from the hinged bar 32$^a$, suffering the latter to drop to its normal or horizontal position.

Having thus described my invention, I claim as new and desire to secure by Letters Patent—

1. The combination, with the frame of a horse hay-rake and the rear or main rake thereof, of a forward or auxiliary rake provided with a keeper-bar attached to its head, and a spring-actuated foot-lever fulcrumed upon the frame of the implement capable of contact with the said keeper to retain the auxiliary rake in an elevated position, substantially as shown and described.

2. In a horse hay-rake, the combination, with the frame of the implement, a main or rear rake, a spring-actuated angled latch-lever pivoted upon the head of the main rake, and a bar hinged to the forward face of the said rake-head, of an auxiliary or forward rake, and a strap or chain connecting the hinged bar on the head of the main rake with the head of the auxiliary rake, all combined for operation substantially as and for the purpose specified.

3. In a horse hay-rake, the combination, with the frame of the implement, a main rake, a spring-actuated angled latch-lever pivoted upon the head of the main rake, a bar hinged to the forward side of the main rake-head, and a friction-roller journaled beneath the frame of the implement, of a forward or auxiliary rake, and a strap or chain attached to the hinged bar of the main rake-head and to the head of the auxiliary rake, said chain or strap passing over the said friction-roller, all combined for operation substantially as shown and described.

4. In a horse hay-rake, the combination, with the frame of the implement, a main rake, a spring-actuated angled latch-lever pivoted upon the head of the main rake, a bar hinged to the forward side of the main rake-head, and a friction-roller journaled beneath the frame of the implement, of a forward or auxiliary rake provided with a rearwardly-extending keeper attached to its head, a spring-actuated foot-lever fulcrumed in the frame of the implement capable of contact with the keeper of the auxiliary rake, and a chain or strap connecting the hinged bar of the main rake and the head of the auxiliary rake, said chain or strap passing over the said friction-roller, substantially as and for the purpose specified.

WILLARD CLEMENS.

Witnesses:
A. O. COMSTOCK,
C. L. CARLTON.